July 28, 1959

H. GÖPFERT ET AL 2,896,756

COUPLING ARRANGEMENT ESPECIALLY FOR USE IN
CINEMATOGRAPHIC DEVICES OR THE LIKE

Filed Oct. 10, 1956

2 Sheets-Sheet 2

INVENTOR
Herbert Göpfert
BY Josef Bönisch

ATTORNEY

United States Patent Office 2,896,756
Patented July 28, 1959

2,896,756

COUPLING ARRANGEMENT ESPECIALLY FOR USE IN CINEMATOGRAPHIC DEVICES OR THE LIKE

Herbert Göpfert, Dresden, and Josef Bönisch, Dresden, Weisser Hirsch, Germany, assignors to VEB Zeiss Ikon Dresden, Dresden, Germany Application October 10, 1956, Serial No. 615,094

13 Claims. (Cl. 192—.084)

This invention relates to clutches and more particularly to clutch arrangements for precision devices and apparatus, wherein the clutch arrangement is adapted to couple a mechanism disengageably to a power drive and the mechanism is brought to a substantially immediate standstill in a predetermined position when the clutch is disengaged.

The inventive clutch arrangement may particularly advantageously be used in cinematographic devices, wherein the stoppage of a driven mechanism in a predetermined position is oftentimes of utmost importance for the proper functioning of the device. Thus, such coupling arrangements find use in cinematographic cameras and in certain cases in the projection art, such as for example in projectors for still pictures and motion-pictures, wherein for example shutter, diaphragm and the film advancing elements should always be in the same predetermined position relative to the film gate when the device, i.e. the camera or the projector, are at a standstill.

It is an object of this invention to provide a particularly simple and effective clutch arrangement for disengageably coupling a mechanism of a precision device, in particular a cinematographic device, to a power source in such a manner that the mechanism upon disengagement of the clutch is stopped in a predetermined position without risk that the kinetic energy of the driving power source causes damage to the elements of the clutch arrangement and the mechanism.

A further object of the invention is the provision of a clutch arrangement for the purpose referred to, wherein the arrangement is operative in oppositely directed driving directions, i.e. it operates both when the driving shaft of the power source rotates clockwise or counter-clockwise so as to operate the mechanism in opposite directions.

Moreover, it is an object of this invention generally to improve on clutch arrangements for the purpose referred to as now customarily built.

Figure 1:
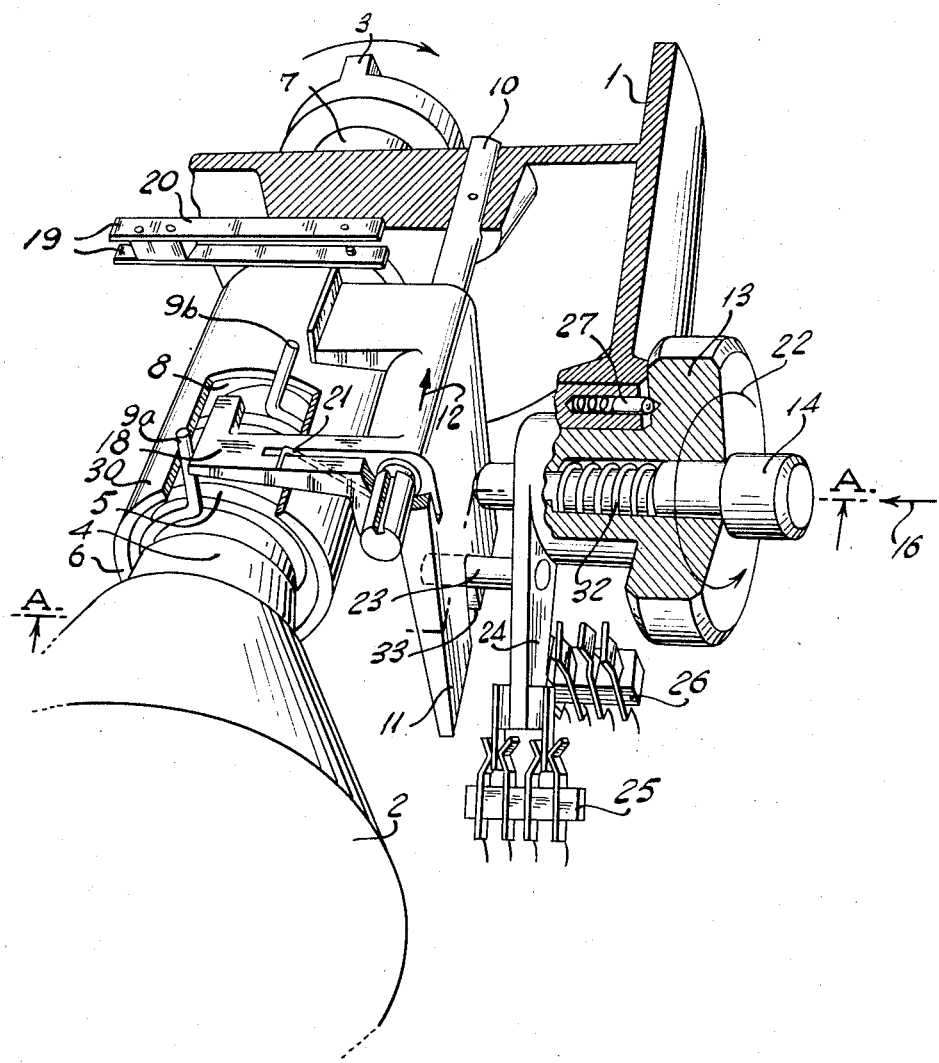
Figure 2:
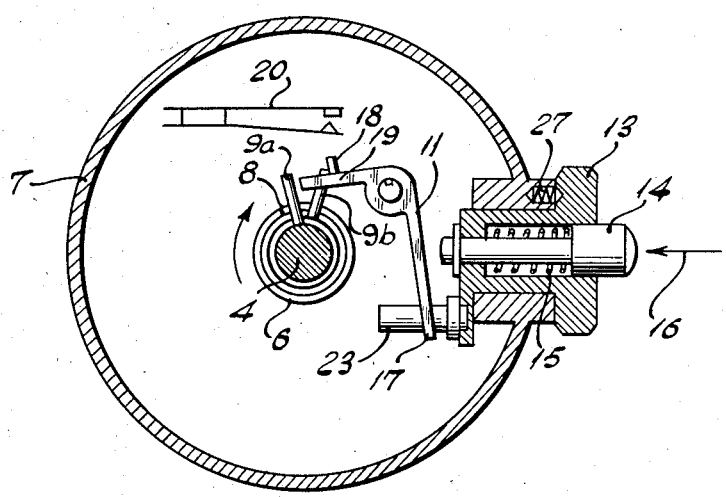
Figure 3:
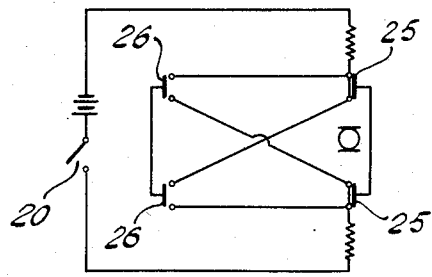

This and other objects and structural details of the invention will become apparent from the following description when read in conjunction with the accompanying drawings, forming part of this specification, wherein:

Fig. 1 is a somewhat diagrammatical, sectional view of a preferred embodiment of a clutch arrangement in accordance with the invention for use in, for example, a cinematographic camera, Fig. 2 is a sectional view on line A—A of Fig. 1, and Fig. 3 shows the wiring diagram for the electric driving motor of, for example, the camera with reversible drive.

Referring now to the drawings and in particular to Figs. 1 and 2, reference numeral 1 indicates a casing accommodating an electric driving motor 2 for, for example a cinematographic camera, and an inventive clutch arrangement generally indicated by reference numeral 30. The clutch arrangement 30 is adapted to couple the incoming power shaft 4 of the driving motor 2 with an outgoing power shaft 7 which in turn may be operatively connected to a mechanism (not shown) to be operated, for example a cinematographic camera mechanism, which latter may be accommodated in a further casing (not shown). The operative connection between the outgoing shaft 7 and the mechanism (not shown) may be accomplished by the coupling element 3 mounted on the shaft 7.

The clutch arrangement 30 comprises an overrunning coupling spring 5 which is mounted in embracing relation on the shaft 4 of the driving motor 2. A hollow cylindrical sleeve member 6 is rigid with the free end of the outgoing shaft 7, i.e. the end facing the incoming shaft 4. The sleeve member 6 surrounds the free end portion of the shaft 4. The sleeve member 6 has a recess 8. The two ends 9a and 9b of the spring 5 pass through this recess 8 and protrude therefrom. A bolt or pin 10 is stationarily mounted within the casing 1 and acts thus as stationary means. A two-armed abutment lever 11, comprising arms 17 and 18, is mounted on said pin 10 for rotation thereabout. Further, the lever 11 is reciprocably movable relative to the pin 10 in the direction of the arrow 12, i.e. parallel to itself in axial direction relative to the stationary means 10. A presetting element 13 is rotatably mounted in the wall of the casing 1 so as to be accessible from the outside. The presetting element 13 has a bore through which passes a release element or push-button 14. The push-button 14 is spring-loaded by the spring 15 accommodated within the bore 32 and the former may be pushed in the direction of arrow 16 against the action of this spring 15.

A controlling member 19 is rigid with the arm 18 of the lever 11. The controlling member 19 controls a pair of electrical terminals 20 arranged within the casing 1 and situated in the current supply line of the electric motor 2. When the terminals 20 are in contact with each other the circuit of the motor 2 is closed so that the latter operates. Resilient means in the form of a spring 21 are arranged within the casing 1 so as to urge the lever 11 in counter-clockwise direction.

The presetting element 13 is rotatable relative to the casing 1 in the direction of the arrow 22 between two end positions (see Fig. 1) and is held in its end positions by a spring-loaded holding element, for example a ball, mounted in a recess in the casing 1 and engaging in a recess in the element 13. The holding arrangement is generally indicated at 27. A pin 23 is rigidly mounted on the presetting element 13 eccentrically relative to the axis of rotation of the presetting element. The pin 23 extends within the casing 1 and passes through and engages in a longitudinal slot 33 in the arm 17 of the lever 11. Upon rotation of the presetting element 13 in the direction of arrow 22, the lever 11—due to the loose engagement of its slot 33 with the pin 23— is thus moved in the axial direction relative to the pin 10.

A controlling means or element 24 is rigidly mounted on the setting element 13. Switches 25 and 26 diagrammatically indicated in Fig. 1 and forming part of the motor wiring illustrated in Fig. 3, serve the purpose of reversing the polarity of the electric motor 2. This reversal of the polarity will be readily understood by the wiring diagram illustrated in Fig. 3. When the polarity of the motor 2 is reversed, the incoming shaft 4 accordingly rotates in opposite direction.

In the embodiment illustrated in Figs. 1 and 2, the arm 18 of the lever 11 is shown as being situated in register with the springs 9a. However, it will be realized that a position may be obtained, wherein the arm 18 of the lever 11 is situated in register with the spring end 9b. For the purpose of attaining this latter position, the presetting element is turned in the direction of arrow 22 into its second end position, whereby the pin 23, rigid with the setting element, causes an axial displacement of the lever 11 relative to the stationary bolt 10. The arm 18 is thus linearly moved until it is in register with the spring end 9b.

The operation of the clutch arrangement 30 here illustrated is as follows: When the mechanism (not shown) for example the camera mechanism, is to be operated by the forward drive of the electric motor 2, the presetting element 13 is set in the position shown in Figs. 1 and 2, wherein the arm 18 of the lever 11 is in register with the spring end 9a. The push-button 14 is now pressed against the action of spring 15 in the direction of the arrow 16 towards the casing 1. The end of the push-button 14 inside the casing 1 thus comes to bear against the arm 17 of the lever 11, whereby the latter is rocked in clockwise direction about the stationary pin 10 against the action of the resilient means. This rocking movement of the lever 11 causes in turn a movement of the arm 18 away from its registering position with the spring end 9a, so that the spring 5 is unobstructed. When the push-button 14 is pressed further into the casing 1, lever 11 is rocked to such extent that the controlling member 19 on the arm 18 closes the terminals 20, whereby the circuit of the electric motor 2 is closed and the latter is thus actuated. The incoming shaft 4 thus starts to rotate. Since the spring ends 9a and 9b project through the recess 8 of the cylindrical sleeve member 6 which latter is rigid with the outgoing shaft 7, the spring end 9b will be moved into contact with the edge of said recess, the reaction thereof tending to tighten the spring on the shaft 4 in clutching engagement. The shaft 7 is thus effectively coupled to the shaft 4 through the spring 5 and the sleeve 6 and corotates with the shaft 4 and the spring 5 rotating in clockwise direction. The mechanism (not shown), coupled to the shaft 7 by the coupling element 3, is thus operated. The operation of the motor 2 and thus the mechanism (not shown) is continued as long as the push-button 14 remains depressed.

When the mechanism (not shown) is to be stopped, the pressure on the push-button 14 is discontinued, whereby the spring 15 urges the push-button 14 back into its starting position. The return movement of the push-button 14 causes its disengagement from the arm 17. The spring or resilient means 21 now urges the lever 11 back into its starting position in counter-clockwise direction, whereby first the controlling member 19 is moved away from the terminals 20 so that the latter open the circuit of the electric motor 2, whereafter the arm 18 is rocked back into its registering position with the spring end 9a. The spring end 9a thus comes to bear on the arm 18, tending to lift and move the spring end in the unwinding direction as the shaft 4 continues to rotate, whereby its frictional clutching engagement with the shaft 4 will be released and further rotation of the spring 5 is prevented. The operative coupling between the shafts 4 and 7 and the operative connection between the shaft 4 and the spring 5 are thus broken at the same time and the shaft 7 comes immediately to a standstill while the shaft 4 will continue to rotate relative to the now stationary spring for some time due to its momentum. It will be realized that the shaft 7 and thus the mechanism (not shown) coupled thereto are thus stopped in a predetermined position. This is of great imporance in many instances, as for example in a camera mechanism controlling the shutter action of the camera, wherein the opening and closing of the shutter has to be synchronized to other camera functions.

In case the mechanism (not shown) is to be operated in reverse direction, the presetting element 13 is turned in the direction of the arrow 22 into its other end position resulting in a linear displacement of the lever 11 relative to the stationary pin 10, whereby the arm 18 is moved into a position in register with the spring end 9b as previously explained. Further, the rotation of the presetting element 13 causes a displacement of the controlling element 24, whereby the field of the electric driving motor 2 is reversed by the provision of the switches 25 and 26 in accordance with the wiring circuit shown in Fig. 3. The motor 2 is thus adapted for reverse drive so that in the embodiment here illustrated the incoming shaft upon actuation of the motor 4 will rotate in counter-clockwise direction. The operation of the arrangement for reverse operation is identical with that for forward drive. However, when the mechanism (not shown) is to be stopped, the spring end 9b—and not 9a—will bear against the arm 18 of the lever 11.

It will be realized that means may be provided cooperating with the push-button 14 in its depressed position, so as to hold the push-button 14 in this depressed position, whereby it is rendered superfluous to apply continuous pressure on the push-button during the operation of the mechanism.

The inventive clutch arrangement may particularly advantageously be used in conjunction with cinematographic devices. However, it will be readily understood that the inventive clutch arrangement may be employed in other precision devices and apparatus comprising a driven mechanism which is to be stopped in a predetermined position.

Although the inventive clutch arrangement has been illustrated in connection with a mechanism to be driven by an electric motor, it is emphasized that the inventive arrangement may be used as well for mechanisms driven by different power sources.

From the preceding description it will be gathered that the inventive clutch arrangement comprises a springy overrunning mechanism arranged between the power source, e.g. an electric motor, and the mechanism to be coupled. One end of the spring serves the purpose of effecting an operative connection between mechanism and power drive, so that the drive of the power source is transmitted to the mechanism to be driven, while the other spring end serves the purpose to initiate the overrunning or free-wheeling action and to hold the driven mechanism in a predetermined position, when the coupling between power source and mechanism is disengaged.

The inventive clutch arrangement may also be employed when the driving means rotate in opposite direction so as to drive the mechanism reversibly. In this case the functions of the spring ends are reversed.

With a view to preventing damage to structural elements upon disengagement of the clutch, which damage may be due to the kinetic energy of the masses to be stopped, the power source, e.g. the electric motor is disconnected first, whereafter the overrunning action is initiated and the mechanism is stopped at the same time. In analogous manner, upon starting the mechanism by engaging the clutch, the overrunning action is first stopped whereafter the motor is switched on.

It has been pointed out that the inventive clutch arrangement is particularly suitable for use in cinematographic devices. Due to the constant and rapid development of the importance of narrow amateur films of e.g. 16 mm. or less, the employment of an inventive clutch arrangement in cinematographic cameras has gained considerable importance. This is due to the fact that narrow films, e.g. 16 mm. films in contrast to 35 mm. films, usually are not cut. In cameras without arrangement for stopping the camera mechanism in a predetermined position, however, a cutting of the film is unavoidable, since due to the gradual running out or stopping of the camera mechanism which may finally come to a standstill in any position, overexposed pictures are obtained. If the camera mechanism—as is commonly the case—is braked by reversing the driving direction of the driving motor, then double-exposed pictures are often obtained. In case the shutter of the camera does not properly cover the film gate during a stand-still of the camera mechanism, then the pictures may of course be completely useless. It will thus be realized that it is of utmost importance that the camera mechanism controlling the shutter and other camera functions is brought to a stand-still in a predetermined position synchronized to the camera functions controlled by the mechanism. Such immediate stoppage of the camera mechanism is effectively obtained in a simple manner without significant expenditure, if the mechanism is disengageably coupled to the driving source by an inventive clutch arrangement.

We have described a preferred embodiment of our invention, but it is understood that this disclosure is for the purpose of illustration, and that various changes in shape and proportion, as well as the substitution of equivalent elements for those herein shown and described may be made without departing from the spirit and scope of the invention as set forth in the appended claims.

What we claim is:

1. In a clutch arrangement for a precision device, the combination of: a rotatable incoming power shaft, a rotatable outgoing power shaft coaxial with and spaced from said incoming power shaft, a coupling spring wound around said incoming power shaft, said coupling spring normally operatively engaging said incoming power shaft for rotation with the latter, said coupling spring being capable of being conditioned for disengagement of its operative engagement with said incoming power shaft, said outgoing shaft having a cylindrical sleeve member surrounding said incoming shaft and said spring, said cylindrical sleeve member having a side recess, said coupling spring having two axially spaced end portions extending outwardly through said recess, one selectively, of said end portions, depending upon the direction of rotation of said incoming power shaft, being in operative engagement with said sleeve member for rotating said outgoing power shaft together with said incoming power shaft, and controlling means being adjustable between at least one effective position and an ineffective position, the other end portion of said coupling spring projecting outwardly for abutting engagement with said adjustable controlling means when the latter is in its effective position, whereby said outgoing power shaft is held in a predetermined position and said coupling spring is conditioned for disengagement of its operative engagement with said incoming power shaft.

2. In a clutch arrangement as claimed in claim 1, said adjustable controlling means comprising movable abutting means movable between said effective and ineffective positions, holding means cooperating with said abutting means for normally holding same in the effective position, and movable actuating means capable of cooperation with said abutting means for moving same from the effective into the ineffective positions.

3. In a clutch arrangement as claimed in claim 2, said movable abutting means comprising a rockable two-armed lever, one arm of said lever being capable of abutting against said other of said end portions, said holding means comprising resilient means and said actuating means being capable of bearing against the other arm of said lever for rocking the lever from the effective into the ineffective position.

4. In a clutch arrangement as claimed in claim 2, said actuating means comprising a spring-loaded push-button.

5. In a clutch arrangement for a precision device, the combination of: a rotatable incoming power shaft, a rotatable outgoing power shaft coaxial with and spaced from said incoming power shaft, said incoming and outgoing power shaft being capable of rotation in clockwise and counter-clockwise direction, a coupling spring wound around said incoming shaft, said coupling spring normally operatively engaging said incoming power shaft for rotation with the latter, said coupling spring being capable of being conditioned for disengagement of its operative engagement with said incoming power shaft, said outgoing power shaft having a cylindrical sleeve member surrounding said incoming shaft and said spring, said cylindrical sleeve member having a side wall recess, said coupling spring having two axially spaced end portions extending outwardly through said recess, one of said two end portions, selectively, depending upon the direction of rotation of said incoming shaft being in operative engagement with said sleeve member, and adjustable controlling means being adjustable between a first and a second effective position and an ineffective position, said controlling means in said first effective position abutting against the other of said projecting end portions of said coupling spring, whereby said outgoing power shaft is held in a predetermined position and said coupling spring is conditioned for disengagement of its operative engagement with said incoming power shaft when the latter is adapted for rotation in one of said clockwise and counter-clockwise directions, and said controlling means in said second effective position abutting against said one of said projecting end portions of said coupling spring whereby said outgoing power shaft is held in a predetermined position and said coupling spring is conditioned for disengagement of its operative engagement with said incoming power shaft when the latter is adapted for rotation in the other one of said clockwise and counter-clockwise directions.

6. In a clutch arrangement having adjustable controlling means comprising movable abutting means movable between said two effective positions and said ineffective position, as claimed in claim 5, movable presetting means for selectively presetting said abutting means into one of said first and second effective positions, holding means cooperating with said abutting means for holding same in one of said effective positions, and actuating means capable of moving said abutting means for said first and second effective positions into said ineffective position.

7. In a clutch arrangement as claimed in claim 6, stationary means, said abutting means comprising a two-armed lever rockable about said stationary means between said first effective position and said ineffective position and between said second effective position and said ineffective position and further movable along said stationary means between said first and second effective positions, one arm of said lever being capable of engagement, selectively, with one of said end portions at a time, said presetting means comprising a rotatable element having eccentric means engaging in the other arm of said lever for effecting the parallel displacement of said lever along said stationary means upon rotation of said presetting means, and said holding means comprising resilient means.

8. In a clutch arrangement as claimed in claim 6, said actuating means comprising a spring-loaded push-button.

9. In a clutch arrangement as claimed in claim 6, stationary means, said abutting means comprising a two-armed lever mounted for rocking about said stationary means and for reciprocal movement along said stationary means, one arm of said lever being capable of abutting engagement with either one of said end portions, said presetting means comprising a rotatable element having a bore and comprising a pin eccentrically mounted on said rotatable element, the other arm of said lever having a recess, said pin engaging in said recess for effecting the parallel displacement of said lever between said two effective positions upon rotation of said rotatable element, said holding means comprising a spring urging said lever into one of the effective positions and said actuating means comprising a spring-loaded push-button mounted in said bore and being capable of pressing against said other arm for rocking said lever from the effective into the ineffective positions.

10. In combination with a clutch arrangement as claimed in claim 1, an electric motor for driving said incoming power shaft, said motor having circuit closing terminals arranged in the path of said adjustable controlling means, intermediate said effective and ineffective positions, said controlling means switching on said motor by closing said terminals when said controlling means move from the effective into the ineffective position, and said controlling means switching off said motor by opening said terminals when said controlling means move from the ineffective to the effective positions.

11. In combination with a clutch arrangement as claimed in claim 5, an electric motor including reversing means for reversing the driving direction of the motor, said motor having circuit-closing terminals situated in the path of said adjustable controlling means intermediate said first and second effective positions and said ineffective position, said adjustable controlling means comprising a controlling element, said controlling element cooperating with said reversing means for reversing the driving direction of the motor when said adjustable controlling means are moved from one effective position into the other effective position, said controlling means switching on said motor by closing said terminals when said controlling means move from one of the effective into the ineffective position, and said controlling means switching off said motor by opening said terminals when said controlling means move from said ineffective position into one of said effective positions.

12. In a cinematographic device, the combination of: an electric motor, reversing means for reversing the driving direction of said motor, an incoming rotatable shaft capable of being rotated in clockwise and counter-clockwise direction by said motor, an outgoing rotatable shaft coaxial with and spaced from said incoming power shaft for connection to a cinematographic mechanism, a coupling spring wound around said incoming shaft, said coupling spring normally operatively engaging said incoming shaft for rotation with the latter, said coupling spring being capable of being conditioned for disengagement of its operative engagement with said incoming shaft, said coupling spring having two end portions; a hollow sleeve portion rigid with said outgoing shaft and surrounding said coupling spring, said sleeve portion having a side wall recess, said two end portions of said coupling spring passing through said recess and projecting therefrom, stationary means, a two-armed lever rockably mounted on said stationary means and movable along said stationary means, resilient means cooperating with said lever and normally urging one arm of said lever into effective abutting engagement with one at a time of said end portions, a rotatable presetting element having a central bore, a pin eccentrically mounted on said presetting element, the other arm of said lever having a recess, said pin engaging in said recess for moving said lever along said stationary means upon rotation of said presetting element from the abutting engagement with one of said end portions into abutting engagement with the other one of said end portions, a spring-loaded push-button mounted in said bore and capable of bearing against said other arm of said lever for rocking same into an ineffective position away from said end portions, said motor having circuit-closing terminals situated within the rocking path of said lever intermediate the effective abutting positions of the lever with one of said end portions and the ineffective portion, said coupling spring being conditioned for disengagement of its operative engagement with said incoming shaft and said outgoing shaft being held in a predetermined position when said lever abuts against one of said end portions, said lever upon being rocked by said push-button about said stationary means into the ineffective position closing said terminals, whereby said motor is switched on, and, upon release of said push-button, said resilient means moving said lever back into its abutting engagement with said one of said end portions, whereby said terminals are opened and the motor is switched off.

13. In a cinematographic device as claimed in claim 12, said presetting element including a controlling element for cooperation with said reversing means of said motor, said controlling element, upon displacement of said lever from its engagement with said one of said end portions and into engagement with the other one of said end portions, actuating said reversing means for reversing the driving direction of the motor.

References Cited in the file of this patent

UNITED STATES PATENTS

| 1,214,680 | Hochriem | Feb. 6, 1917 |
| 2,583,685 | Davis | Jan. 29, 1952 |
| 2,614,672 | Launder | Oct. 21, 1952 |
| 2,631,470 | Sandberg | Mar. 17, 1953 |

FOREIGN PATENTS

| 737,669 | Great Britain | Sept. 28, 1955 |